US012601650B2

(12) United States Patent
Nishikawa

(10) Patent No.: US 12,601,650 B2
(45) Date of Patent: Apr. 14, 2026

(54) PRESSURE SENSOR DEVICE HAVING AN OSCILLATOR INCLUDING A MEMBRANE DEFORMABLE TO AMBIENT DIFFERENTIAL PRESSURE

(71) Applicant: Murata Manufacturing Co., Ltd., Nagaokakyo (JP)

(72) Inventor: Hiroaki Nishikawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 456 days.

(21) Appl. No.: 18/125,788

(22) Filed: Mar. 24, 2023

(65) Prior Publication Data

US 2023/0228641 A1 Jul. 20, 2023

Related U.S. Application Data

(63) Continuation of application No. PCT/JP2021/034055, filed on Sep. 16, 2021.

(30) Foreign Application Priority Data

Oct. 12, 2020 (JP) ................................. 2020-172138

(51) Int. Cl.
*G01L 19/14* (2006.01)
*G01L 9/12* (2006.01)
(52) U.S. Cl.
CPC ................ *G01L 19/14* (2013.01); *G01L 9/12* (2013.01)
(58) Field of Classification Search
None
See application file for complete search history.

(56) References Cited

U.S. PATENT DOCUMENTS

| | | | | |
|---|---|---|---|---|
| 7,194,901 B2* | 3/2007 | Silverbrook | .......... | G01L 9/0072 |
| | | | | 73/146 |
| 7,640,807 B2* | 1/2010 | Tamura | ................... | G01P 1/023 |
| | | | | 73/514.33 |
| 8,096,187 B2* | 1/2012 | Sato | ...................... | G01L 9/0025 |
| | | | | 73/717 |

(Continued)

FOREIGN PATENT DOCUMENTS

| | | |
|---|---|---|
| EP | 2871456 A1 | 5/2015 |
| JP | 0933371 A | 2/1997 |

(Continued)

OTHER PUBLICATIONS

International Search Report in PCT/JP2021/034055, mailed Nov. 16, 2021, 4 pages.

(Continued)

*Primary Examiner* — Peter J Macchiarolo
*Assistant Examiner* — Jermaine L Jenkins
(74) *Attorney, Agent, or Firm* — Keating & Bennett, LLP

(57) ABSTRACT

A pressure sensor device includes a base including joint portions to join to a mounting substrate, and an oscillator to oscillate with respect to the base. The oscillator includes a capacitor including a membrane that is deformable in accordance with an ambient pressure difference as a sensor electrode and a facing electrode spaced apart from the membrane. The membrane does not overlap the base in plan view in a direction orthogonal or substantially orthogonal to the membrane.

18 Claims, 7 Drawing Sheets

(56)                    References Cited

U.S. PATENT DOCUMENTS

| | | | |
|---|---|---|---|
| 8,304,274 B2* | 11/2012 | Zuniga-Ortiz | H01L 25/165 |
| | | | 438/50 |
| 9,226,079 B2* | 12/2015 | Sciutti | H04R 19/04 |
| 9,643,837 B1 | 5/2017 | Herrmann | |
| 10,094,724 B2* | 10/2018 | Shimoyama | G01L 23/18 |
| 10,260,981 B2* | 4/2019 | Holm | G01L 9/0052 |
| 10,451,507 B2* | 10/2019 | Seto | G01L 9/0052 |
| 11,740,149 B2* | 8/2023 | Girardey | G01L 9/0072 |
| | | | 73/718 |
| 2002/0011114 A1 | 1/2002 | Miyashita et al. | |
| 2008/0128840 A1 | 6/2008 | Benzel | |
| 2015/0122041 A1 | 5/2015 | Lin et al. | |

FOREIGN PATENT DOCUMENTS

| | | | |
|---|---|---|---|
| JP | 09145512 A | 6/1997 | |
| JP | 2001255225 A | 9/2001 | |
| JP | 2006153804 A | 6/2006 | |
| JP | 2007093234 A | 4/2007 | |
| JP | 2008517288 A | 5/2008 | |
| JP | 2017156241 A | 9/2017 | |

OTHER PUBLICATIONS

Written Opinion in PCT/JP2021/034055, mailed Nov. 16, 2021, 5 pages.

\* cited by examiner

PRESSURE SENSOR DEVICE HAVING AN OSCILLATOR INCLUDING A MEMBRANE DEFORMABLE TO AMBIENT DIFFERENTIAL PRESSURE

CROSS REFERENCE TO RELATED APPLICATIONS

This application claims the benefit of priority to Japanese Patent Application No. 2020-172138 filed on Oct. 12, 2020 and is a Continuation Application of PCT Application No. PCT/JP2021/034055 filed on Sep. 16, 2021. The entire contents of each application are hereby incorporated herein by reference.

BACKGROUND OF THE INVENTION

1. Field of the Invention

The present invention relates to a pressure sensor device that measures pressure, such as air pressure or water pressure, and changes in pressure.

2. Description of the Related Art

A pressure sensor can be manufactured using MEMS (microelectromechanical system) technology obtained through the application of semiconductor manufacturing technology, and an ultra-compact sensor of, for example, approximately 0.5 mm to 2 mm square can be achieved. A typical pressure sensor has a capacitor structure with two electrodes and can measure pressure by sensing changes in the electrostatic capacitance caused by changes in ambient pressure.

EP Publication No. 2871456A1 discloses a surface mount pressure sensor having solder balls. This pressure sensor has a structure in which the membrane portion of the pressure sensor is isolated from the stress applied through the solder balls when the pressure sensor is mounted on a substrate. The pressure sensor has a structure in which an integrated circuit is integrated with the membrane, and a gap for isolation from the stress is present between the joint substrate having the solder balls and the support substrate having the membrane. The support substrate is supported by a cantilever structure of the joint substrate.

JP-A-2017-156241 discloses a pressure sensor in which a plurality of piezoresistive elements are disposed on a diaphragm. A through-groove is formed around the diaphragm with a connecting portion remaining, and the diaphragm is supported by the cantilever structure.

When the pressure sensor is mounted on the substrate in the process of manufacturing an electronic device, such as a smart watch or a smartphone, the impact of the chip mounter is assumed to be applied to the sensor body. In addition, when such an electronic device is used, a large impact caused by a drop or handling by the user is assumed to be applied to the sensor body.

In EP Publication No. 2871456A1, the support substrate for the membrane is supported by a cantilever structure. Accordingly, when an impact is applied to the sensor body, the support substrate vibrates up and down. When the amplitude is larger than the gap, the support substrate collides with the joint substrate, possibly deforming or damaging the membrane. Alternatively, when vibration is applied during use, because the pressure in the upper portion of the membrane changes due to a change in the gap, the characteristics of the membrane change. Accordingly, an error in the atmospheric pressure value due to the vibration is assumed to be larger than usual.

SUMMARY OF THE INVENTION

Preferred embodiments of the present invention provide pressure sensor devices that are each able to reduce or prevent deformation, damage, and a change in the characteristics of the membrane due to an external impact.

A pressure sensor device according to a preferred embodiment of the present invention that detects a change in an electrostatic capacitance between electrodes includes a base including a joint portion to join to a mounting substrate, and an oscillator to oscillate with respect to the base, wherein the oscillator includes a capacitor including a membrane that is deformable in accordance with an ambient pressure difference as a sensor electrode and a facing electrode spaced apart from the membrane, and the membrane does not overlap the base in plan view in a direction orthogonal or substantially orthogonal to the membrane.

According to preferred embodiments of the present invention, deformation, damage, and a change in the characteristics of the membrane due to an external impact are able to be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figures 1A, 1B, 1C, 1D:
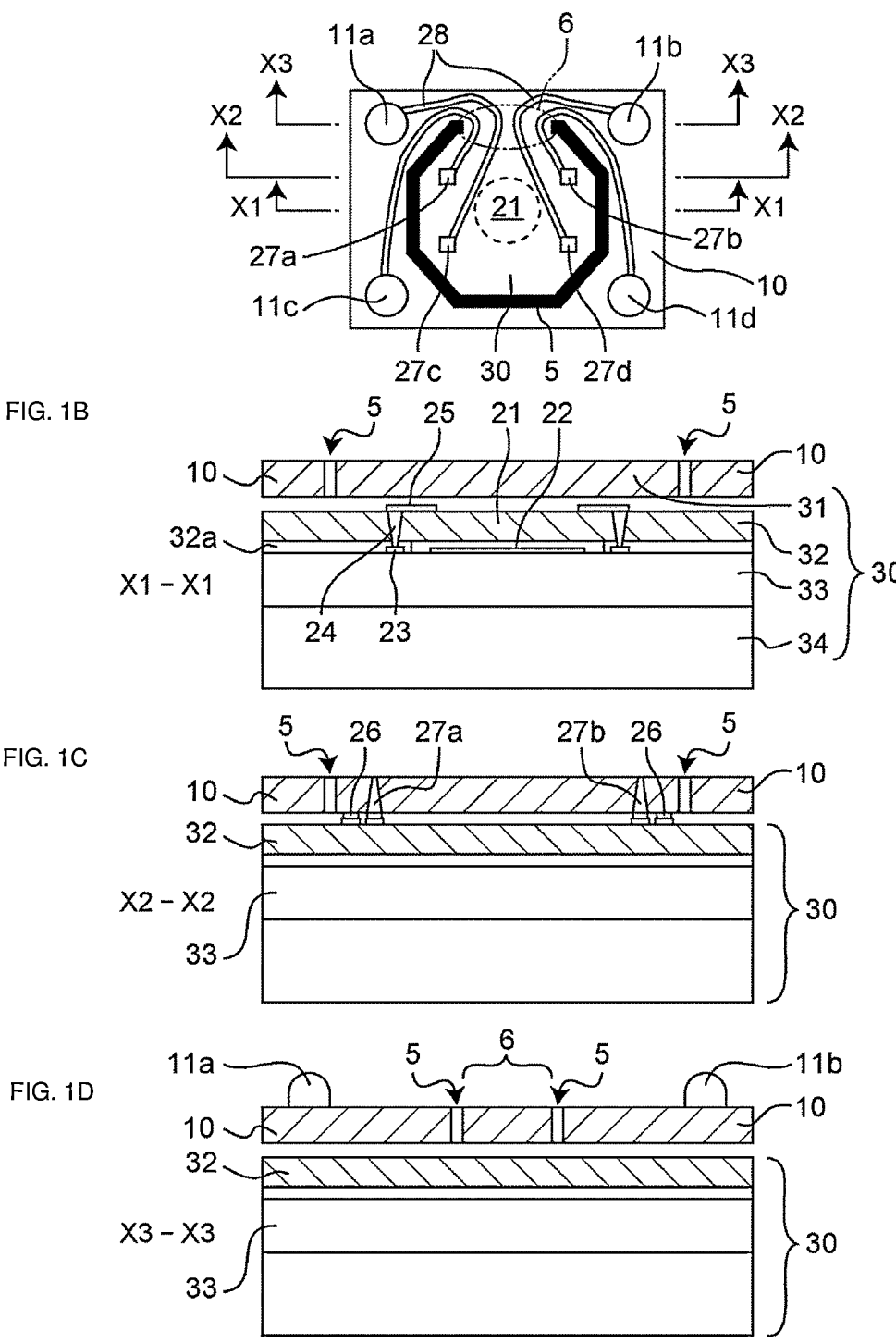
FIG. 1A is a plan view illustrating an example of the structure of a pressure sensor device according to preferred embodiment 1 of the present invention.
FIGS. 1B to 1D are sectional views taken along line X1-X1, line X2-X2, and line X3-X3 in FIG. 1A.

Preferred embodiments of the present invention will be described below with reference to the drawings.

According to a preferred embodiment of the present invention, a pressure sensor device includes a base including a joint portion to join to a mounting substrate, and an oscillator to oscillate with respect to the base, wherein the oscillator includes a membrane that is deformable in accordance with an ambient pressure difference as a sensor electrode, and the membrane does not overlap the base in plan view in a direction orthogonal or substantially orthogonal to the membrane.

In this structure, the membrane does not overlap the base in plan view in the direction orthogonal or substantially orthogonal to the membrane. Accordingly, even when the oscillator vibrates up and down due to an external impact on the sensor body, the membrane does not collide with the base. As a result, deformation, damage, and a change in the characteristics of the membrane due to an external impact can be reduced or prevented.

In a preferred embodiment of the present invention, preferably, an isolation groove that isolates the base and the oscillator from each other and an elastic coupling portion that elastically couples the base and the oscillator to each other are provided between the base and the oscillator.

In this structure, the presence of the isolation groove reduces the moment of inertia of area and can increase the elastic deformation in the elastic coupling portion. This can easily achieve the structure in which the oscillator can oscillate with respect to the base.

In a preferred embodiment of the present invention, preferably, the base is disposed outside the oscillator.

In this structure, the distance to the membrane from the joint portion to join to the mounting substrate can be increased. For example, when a solder ball is used as the joint portion, the effect of foreign matter due to the infiltration of flux or the like can be reduced.

In a preferred embodiment of the present invention, preferably, the oscillator is disposed outside the base.

In this structure, the distance to the membrane from the joint portion to join to the mounting substrate can be increased. For example, when a solder ball is used as the joint portion, the effect of foreign matter due to the infiltration of flux or the like can be reduced.

In a preferred embodiment of the present invention, preferably, the oscillator includes a first layer located on the same plane as the base, a second layer fixed to the first layer with a gap therebetween, the second layer including the membrane, and a third layer facing the second layer.

In this structure, the installation area of the entire sensor can be reduced by providing such a laminated structure.

In a preferred embodiment of the present invention, preferably, the oscillator includes a plurality of membranes connected in parallel to each other, the membrane being one of the plurality of membranes.

In this structure, deviations of the membrane characteristics are averaged because the signals obtained from a plurality of membranes are averaged, thus enabling a reduction in measurement error.

In a preferred embodiment of the present invention, preferably, the oscillator includes an integrated circuit to process an electric signal generated by deformation of the membrane.

In this structure, since the output of the membrane is high impedance, the effect of noise can be reduced by locating the integrated circuit near the membrane.

In a preferred embodiment of the present invention, preferably, the oscillator includes a plurality of via terminals through which electricity is supplied to the integrated circuit and the signal output from the integrated circuit is transmitted, the base has the same number of joint portions as the via terminals, the joint portion being one of the joint portions, and the via terminals and the joint portions are electrically connected to each other by a plurality of conductors.

In this structure, since the output of the integrated circuit is low impedance, the effect of noise is small even when the signal line is long.

In a preferred embodiment of the present invention, preferably, the oscillator includes a capacitor including a facing electrode spaced apart from the membrane to detect a change in an electrostatic capacitance of the capacitor.

In this structure, the change in ambient pressure can be measured by detecting the change in the electrostatic capacitance of the capacitor.

In a preferred embodiment of the present invention, preferably, the facing electrode is provided on the third layer.

In this structure, the facing electrode of the capacitor can be located efficiently.

Preferred Embodiment 1

FIG. 1A is a plan view illustrating an example of the structure of a pressure sensor device according to preferred embodiment 1 of the present invention, and FIGS. 1B to 1D are sectional views taken along line X1-X1, line X2-X2, and line X3-X3 in FIG. 1A.

The pressure sensor device includes a base 10 and an oscillator 30 disposed inside the base 10. The base 10 includes an electrically insulated substrate, and a plurality of (for example, four) joint portions 11a to 11d to join to the mounting substrate to be built into a product are provided on the substrate. The joint portions 11a to 11d are made of, for example, solder balls, conductive adhesives, and the like and provide electrical and mechanical connections.

The oscillator 30 is supported so as to be able to oscillate with respect to the base 10, and a cantilever structure is provided as an example here. To achieve the oscillation support structure as described above, a C-shaped isolation groove 5 that isolates most of the portion between the base 10 and the oscillator 30 and an elastic coupling portion 6 that elastically couples the base 10 and the oscillator 30 to each other are provided between the base 10 and the oscillator 30. The elastic modulus of the elastic coupling portion 6 can be set to a desired value by adjusting Young's modulus of the material, the sectional shape, the moment of inertia of area, and the like.

As illustrated in FIG. 1B, the oscillator 30 includes an oscillating substrate 31 disposed as the first layer, a membrane substrate 32 disposed as the second layer, and an integrated circuit 33 and a die 34 disposed as the third layer. The installation area of the entire sensor can be reduced by providing such a laminated structure.

The oscillator 30 includes a capacitor including a membrane 21 that is deformable in accordance with an ambient pressure difference as a sensor electrode and a facing electrode 22 spaced apart from the membrane 21. The electrostatic capacitance Cs between the electrodes is expressed as $Cs=\varepsilon \times S/d$ by using the dielectric constant $\varepsilon$ of the gap, the electrode area S, and the inter-electrode distance d. When the membrane 21 elastically deforms according to the pressure difference between the outside and the gap, the inter-electrode distance d between the membrane 21 and the facing electrode 22 changes, and the electrostatic capacitance Cs changes accordingly. The amount of change of the external pressure can be measured by measuring the amount of change in the electrostatic capacitance Cs.

As illustrated in FIG. 1B, the oscillator 30 includes the integrated circuit 33 that processes the electric signal from the capacitor. The integrated circuit 33 includes, for example, ASICs, FPGAs, PLDs, CPLDs, and the like that include analog circuits and programmable digital circuits. The integrated circuit 33 is mounted on the die 34. Since the output of the capacitor is high impedance, the effect of noise can be reduced by disposing the integrated circuit 33 near the capacitor.

The facing electrode 22 of the capacitor is provided directly on the upper surface of the integrated circuit 33. In addition, an electrically insulated spacer portion 32a is provided on the upper surface of the integrated circuit 33 to maintain the gap of the capacitor. The membrane substrate 32 having conductivity and flexibility is installed on the spacer portion 32a, and the region not in contact with the spacer portion 32a defines and functions as the deformable membrane 21.

The membrane substrate 32 and the spacer portion 32a include vias 24, conductors 25, and the like to electrically connect to terminals 23 of the integrated circuit 33, and an electrically insulated layer (not illustrated) is provided between the vias 24 and the membrane substrate 32 and between the conductors 25 and the membrane substrate 32. In addition, as illustrated in FIGS. 1A and 1C, spacers 26 having conductivity are provided on the upper surface of the membrane substrate 32, and vias 27a to 27d are provided in the oscillating substrate 31. The vias 27a to 27d are electrically connected to the joint portions 11a to 11d, respectively, through a plurality of (for example, four) conductors 28 provided on the upper surface of the oscillating substrate 31. Electricity can be supplied from the mounting substrate of a product to the integrated circuit 33 or the output signal from the integrated circuit 33 can be transmitted to the mounting substrate through the terminals 23, the vias 24, the conductors 25, the spacers 26, the vias 27a to 27d, the conductors 28, and the joint portions 11a to 11d.

A total of four lines including a power supply line, a ground line, and two signal lines are generally provided as lines for the integrated circuit 33.

In the present preferred embodiment, the membrane 21 is disposed so as not to overlap the base 10 in plan view (see FIG. 1A) in the direction orthogonal or substantially orthogonal to the membrane 21. Accordingly, even when the oscillator 30 vibrates up and down due to an external impact on the sensor body, the membrane 21 does not collide with the base 10. As a result, deformation, damage, and a change in the characteristics of the membrane due to an external impact can be reduced or prevented.

In addition, the base 10 is disposed outside the oscillator 30 across the isolation groove 5. This can increase the distance to the membrane 21 from the joint portions 11a to 11d for joining to the mounting substrate. For example, when solder balls are used as the joint portions 11a to 11d, the effect of foreign matter due to the infiltration of flux or the like can be reduced.

Preferred Embodiment 2

Figure 2A:
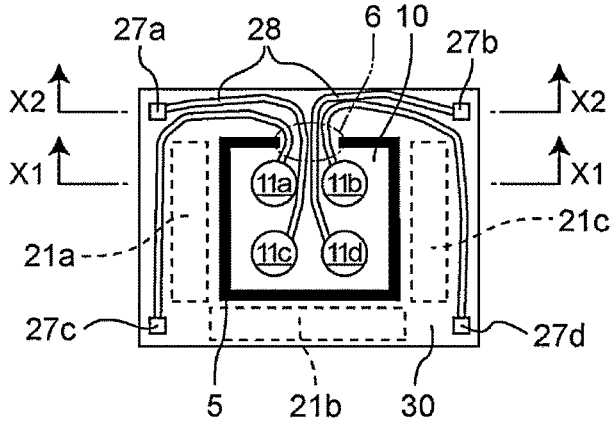
FIG. 2A is a plan view illustrating an example of the structure of a pressure sensor device according to preferred embodiment 2 of the present invention.
Figure 2B:
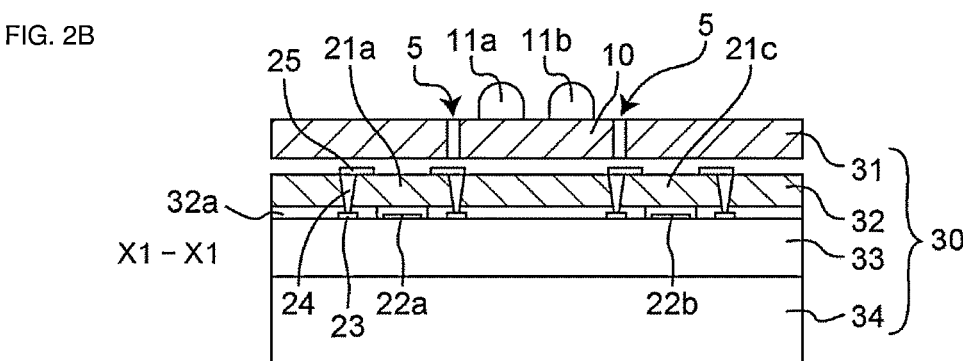
FIGS. 2B and 2C are sectional views taken along line X1-X1 and line X2-X2 in FIG. 2A.
Figure 2C:
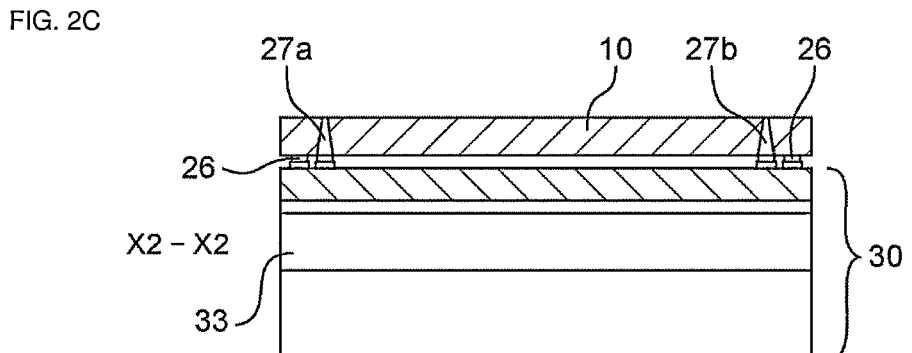

FIG. 2A is a plan view illustrating an example of the structure of a pressure sensor device according to preferred embodiment 2 of the present invention, and FIGS. 2B and 2C are sectional views taken along line X1-X1 and line X2-X2 in FIG. 2A. The basic structure and operation in the present preferred embodiment are the same as or similar to those in preferred embodiment 1, except that the oscillator 30 is disposed outside the base 10.

The pressure sensor device includes the base 10 and the oscillator 30 disposed outside the base 10. The base 10 includes an electrically insulated substrate, and the plurality of (for example, four) joint portions 11a to 11d are provided on the substrate.

The oscillator 30 is supported so as to be able to oscillate with respect to the base 10, and a cantilever structure is provided as an example here. To achieve the oscillation support structure as described above, a C-shaped isolation groove 5 that isolates most of the portion between the base 10 and the oscillator 30 and an elastic coupling portion 6 that elastically couples the base 10 and the oscillator 30 to each other are provided between the base 10 and the oscillator 30.

As illustrated in FIG. 2B, the oscillator 30 includes oscillating substrate 31 disposed as the first layer, the membrane substrate 32 disposed as the second layer, and the integrated circuit 33 and the die 34 disposed as the third layer.

The oscillator 30 includes a plurality of (for example, three) capacitors including a plurality of (for example, three) membranes 21a to 21c that are deformable in accordance with an ambient pressure difference as sensor electrodes and a plurality of (for example, three) facing electrodes 22a to 22c (22c is not illustrated) spaced apart from the membranes 21a to 21c. These capacitors are connected in parallel to each other via internal wiring (not illustrated). Installation of the plurality of capacitors increases the total installation area of the capacitors, thus enabling an improvement of the sensitivity to pressure changes. In addition, the deviations of the capacitor characteristics are averaged because the signals obtained from the plurality of capacitors are averaged, thus enabling a reduction in measurement error.

As illustrated in FIG. 2B, the oscillator 30 includes the integrated circuit 33 that processes the electric signals from the capacitors.

The facing electrodes 22a to 22c of the capacitors are provided directly on the upper surface of the integrated circuit 33. In addition, the electrically insulated spacer portion 32a is provided on the upper surface of the integrated circuit 33 to maintain the gaps of the capacitors. The membrane substrate 32 having conductivity and flexibility is installed on the spacer portion 32a, and the regions not in contact with the spacer portion 32a define and function as the deformable membranes 21a to 21c.

The membrane substrate 32 and the spacer portion 32a include the vias 24, the conductors 25, and the like to connect terminals 23 of the integrated circuit 33, and an electrically insulated layer (not illustrated) is provided between the vias 24 and the membrane substrate 32 and between the conductors 25 and the membrane substrate 32. In addition, as illustrated in FIGS. 2A and 2C, the spacers 26 having conductivity are provided on the upper surface of the membrane substrate 32, and the vias 27a to 27d are provided in the oscillating substrate 31. The vias 27a to 27d are electrically connected to the joint portions 11a to 11d, respectively, through a plurality of (for example, four) conductors 28 provided on the upper surface of the oscillating substrate 31. Electricity can be supplied from the mounting substrate of a product to the integrated circuit 33 or the output signal from the integrated circuit 33 can be transmitted to the mounting substrate through the terminals 23, the vias 24, the conductors 25, the spacers 26, the vias 27a to 27d, the conductors 28, and the joint portions 11a to 11d.

In the present preferred embodiment, the membranes 21a to 21c are disposed so as not to overlap the base 10 in plan view (see FIG. 2A) in the direction orthogonal or substantially orthogonal to the membranes 21a to 21c. Accordingly, even when the oscillator 30 vibrates up and down due to an external impact on the sensor body, the membranes 21a to 21c do not collide with the base 10. As a result, deformation, damage, and a change in the characteristics of the membranes due to an external impact can be reduced or prevented.

In addition, the base 10 is disposed inside the oscillator 30 across the isolation groove 5. This can increase the distance to the membranes 21a to 21c from the joint portions 11a to 11d to join to the mounting substrate. For example, when solder balls are used as the joint portions 11a to 11d, the effect of foreign matter due to the infiltration of flux or the like can be reduced.

Preferred Embodiment 3

Figure 3A:
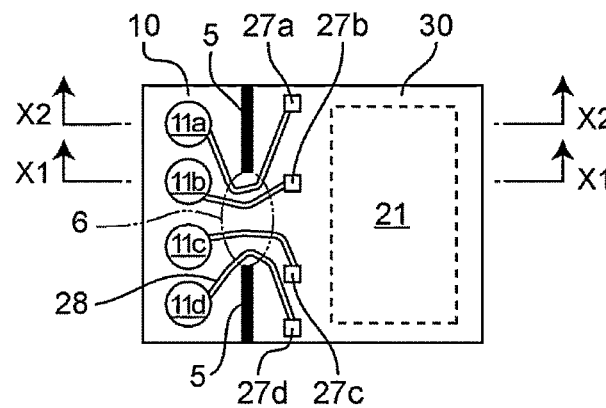
FIG. 3A is a plan view illustrating an example of the structure of a pressure sensor device according to preferred embodiment 3 of the present invention.
Figure 3B:
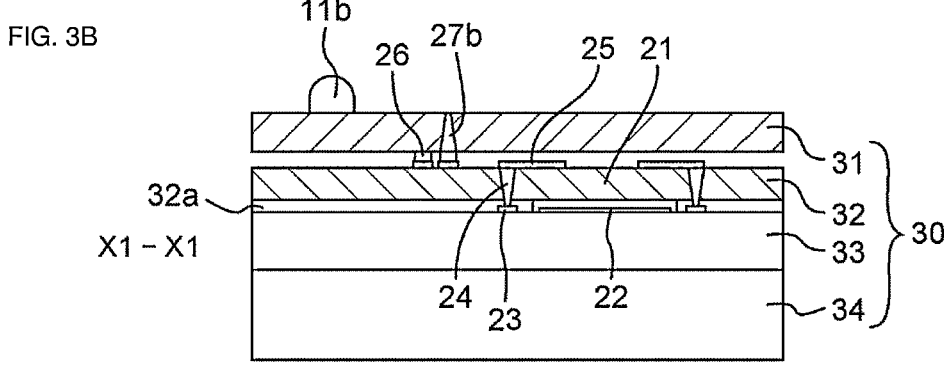
FIGS. 3B and 3C are sectional views taken along line X1-X1 and line X2-X2 in FIG. 3A.
Figure 3C:
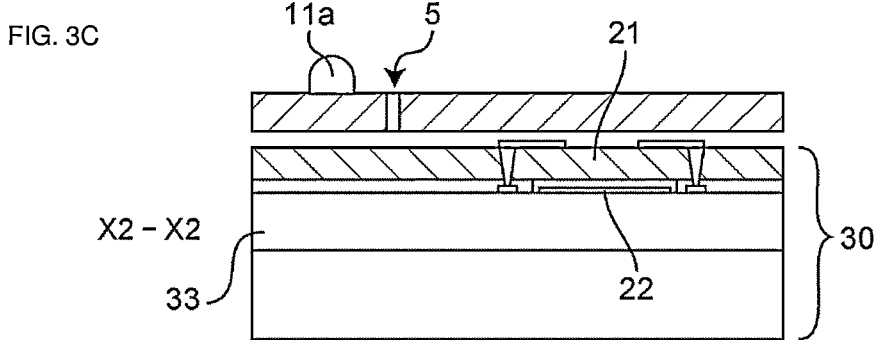

FIG. 3A is a plan view illustrating an example of the structure of a pressure sensor device according to preferred embodiment 3 of the present invention, and FIGS. 3B and 3C are sectional views taken along line X1-X1 and line X2-X2 in FIG. 3A. The basic structure and operation in the present preferred embodiment are the same as or similar to those in preferred embodiment 1, except that the oscillator 30 is disposed laterally to the base 10.

The pressure sensor device includes the base 10 and the oscillator 30 disposed laterally to the base 10. The base 10 includes an electrically insulated substrate, and the plurality of (for example, four) joint portions 11a to 11d are provided on the substrate.

The oscillator 30 is supported so as to be able to oscillate with respect to the base 10, and a cantilever structure is provided as an example here. To achieve the oscillation support structure as described above, a pair of isolation grooves 5 that isolate most of the portion between the base 10 and the oscillator 30 and an elastic coupling portion 6 that elastically couples the base 10 and the oscillator 30 to each other are provided between the base 10 and the oscillator 30.

As illustrated in FIG. 3B, the oscillator 30 includes the oscillating substrate 31 disposed as the first layer, the membrane substrate 32 disposed as the second layer, and the integrated circuit 33 and the die 34 disposed as the third layer.

The oscillator 30 includes a capacitor including the membrane 21 that is deformable in accordance with an ambient pressure difference as a sensor electrode and the facing electrode 22 spaced apart from the membrane 21.

As illustrated in FIG. 3B, the oscillator 30 includes the integrated circuit 33 that processes the electric signal from the capacitor.

The facing electrode 22 of the capacitor is provided directly on the upper surface of the integrated circuit 33. In addition, the electrically insulated spacer portion 32a is provided on the upper surface of the integrated circuit 33 to maintain the gap of the capacitor. The membrane substrate 32 having conductivity and flexibility is installed on the spacer portion 32a, and the region not in contact with the spacer portion 32a defines and functions as the deformable membrane 21.

The membrane substrate 32 and the spacer portion 32a include the vias 24, the conductors 25, and the like to connect terminals 23 of the integrated circuit 33, and an electrically insulated layer (not illustrated) is provided between the vias 24 and the membrane substrate 32 and between the conductors 25 and the membrane substrate 32. In addition, as illustrated in FIGS. 3A and 3B, the spacers 26 having conductivity are provided on the upper surface of the membrane substrate 32, and the vias 27a to 27d are provided in the oscillating substrate 31. The vias 27a to 27d are electrically connected to the joint portions 11a to 11d, respectively, through a plurality of (for example, four) conductors 28 formed on the upper surface of the oscillating substrate 31. Electricity can be supplied from the mounting substrate of a product to the integrated circuit 33 or the output signal from the integrated circuit 33 can be transmitted to the mounting substrate through the terminals 23, the vias 24, the conductors 25, the spacers 26, the vias 27a to 27d, the conductors 28, and the joint portions 11a to 11d.

In the present preferred embodiment, the membrane 21 is disposed so as not to overlap the base 10 in plan view (see FIG. 3A) in the direction orthogonal or substantially orthogonal to the membrane 21. Accordingly, even when the oscillator 30 vibrates up and down due to an external impact on the sensor body, the membrane 21 does not collide with the base 10. As a result, deformation, damage, and a change in the characteristics of the membrane due to an external impact can be reduced or prevented.

In addition, the base 10 is disposed laterally to the oscillator 30 across the isolation groove 5. This can increase the distance to the membrane 21 from the joint portions 11a to 11d to join to the mounting substrate. For example, when solder balls are used as the joint portions 11a to 11d, the effect of foreign matter due to the infiltration of flux or the like can be reduced.

Preferred Embodiment 4

Figure 4A:
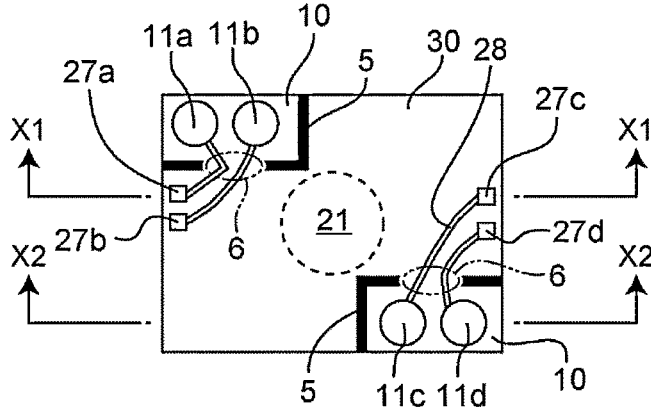
FIG. 4A is a plan view illustrating an example of the structure of a pressure sensor device according to preferred embodiment 4 of the present invention.
Figure 4B:
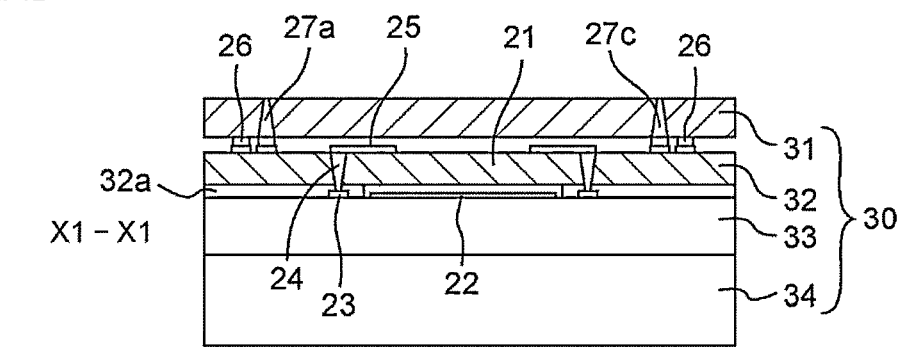
FIGS. 4B and 4C are sectional views taken along line X1-X1 and line X2-X2 in FIG. 4A.
Figure 4C:
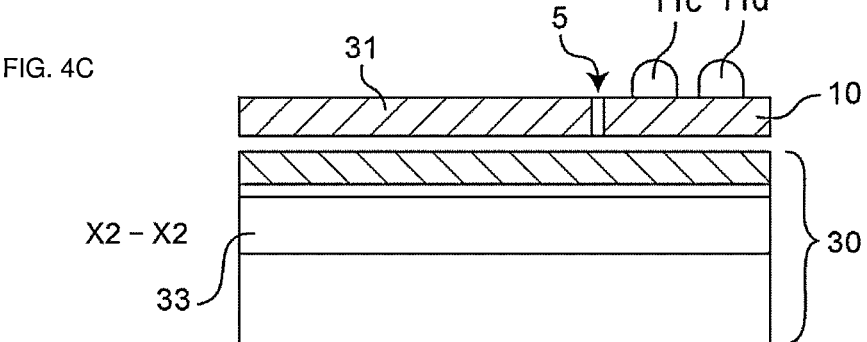

FIG. 4A is a plan view illustrating an example of the structure of a pressure sensor device according to preferred embodiment 4 of the present invention, and FIGS. 4B and 4C are sectional views taken along line X1-X1 and line X2-X2 in FIG. 4A. The basic structure and operation in the present preferred embodiment are the same as or similar to those in preferred embodiment 1 except that bases 10 are disposed in two portions on a diagonal line of the oscillator 30.

The pressure sensor device includes the two bases 10 and the oscillator 30 disposed between the two bases 10. The bases 10 include electrically insulated substrates, and the plurality of (for example, four) joint portions 11a to 11d are provided on the substrates.

The oscillator 30 is supported so as to be able to oscillate with respect to the bases 10, and a both-end supported beam structure is provided as an example here. To achieve the oscillation support structure as described above, a pair of L-shaped isolation grooves 5 that isolate most of the portion between the bases 10 and the oscillator 30 and elastic coupling portions 6 that elastically couple the bases 10 and the oscillator 30 to each other are provided between the bases 10 and the oscillator 30.

As illustrated in FIG. 4B, the oscillator 30 includes the oscillating substrate 31 disposed as the first layer, the membrane substrate 32 disposed as the second layer, and the integrated circuit 33 and the die 34 disposed as the third layer.

The oscillator 30 includes a capacitor including the membrane 21 that is deformable in accordance with an ambient pressure difference as a sensor electrode and the facing electrode 22 spaced apart from the membrane 21.

As illustrated in FIG. 4B, the oscillator 30 includes the integrated circuit 33 that processes the electric signal from the capacitor.

The facing electrode 22 of the capacitor is provided directly on the upper surface of the integrated circuit 33. In addition, the electrically insulated spacer portion 32a is provided on the upper surface of the integrated circuit 33 to maintain the gap of the capacitor. The membrane substrate 32 having conductivity and flexibility is installed on the spacer portion 32a, and the region not in contact with the spacer portion 32a defines and functions as the deformable membrane 21.

The membrane substrate 32 and the spacer portion 32a include the vias 24, the conductors 25, and the like to connect terminals 23 of the integrated circuit 33, and an electrically insulated layer (not illustrated) is provided between the vias 24 and the membrane substrate 32 and between the conductors 25 and the membrane substrate 32. In addition, the spacers 26 having conductivity are provided on the upper surface of the membrane substrate 32, and the vias 27a to 27d are provided in the oscillating substrate 31. The vias 27a to 27d are electrically connected to the joint portions 11a to 11d, respectively, through a plurality of (for example, four) conductors 28 provided on the upper surface of the oscillating substrate 31. Electricity can be supplied from the mounting substrate of a product to the integrated circuit 33 or the output signal from the integrated circuit 33 can be transmitted to the mounting substrate through the terminals 23, the vias 24, the conductors 25, the spacers 26, the vias 27a to 27d, the conductors 28, and the joint portions 11a to 11d.

In the present preferred embodiment, the membrane 21 is disposed so as not to overlap the bases 10 in plan view (see FIG. 4A) in the direction orthogonal or substantially orthogonal to the membrane 21. Accordingly, even when the oscillator 30 vibrates up and down due to an external impact on the sensor body, the membrane 21 does not collide with the bases 10. As a result, deformation, damage, and a change in the characteristics of the membrane due to an external impact can be reduced or prevented.

In addition, the bases 10 are disposed in two portions on a diagonal line of the oscillator 30 across the isolation grooves 5. This can increase the distance to the membrane 21 from the joint portions 11a to 11d to join to the mounting substrate. For example, when solder balls are used as the joint portions 11a to 11d, the effect of foreign matter due to the infiltration of flux or the like can be reduced.

Preferred Embodiment 5

Figure 5A:
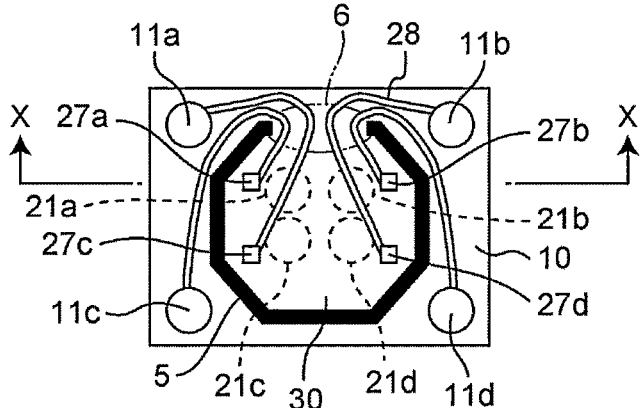
FIG. 5A is a plan view illustrating an example of the structure of a pressure sensor device according to preferred embodiment 5 of the present invention.
Figure 5B:
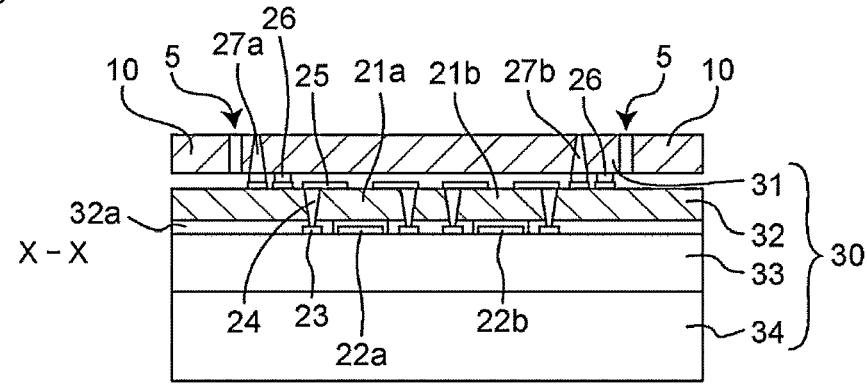
FIG. 5B is a sectional view taken along line X1-X1 in FIG. 5A.

FIG. 5A is a plan view illustrating an example of the structure of a pressure sensor device according to preferred embodiment 5 of the present invention, and FIG. 5B is a sectional view taken along line X1-X1 in FIG. 5A. The basic structure and operation in the present preferred embodiment are the same as or similar to those in preferred embodiment 1 except that a plurality of capacitors are disposed in the oscillator 30.

The pressure sensor device includes the base 10 and the oscillator 30 disposed inside the base 10. The base 10 includes an electrically insulated substrate, and the plurality of (for example, four) joint portions 11a to 11d are provided on the substrate.

The oscillator 30 is supported so as to be able to oscillate with respect to the base 10, and a cantilever structure is provided as an example here. To achieve the oscillation support structure as described above, a C-shaped isolation groove 5 that isolates most of the portion between the base 10 and the oscillator 30 and an elastic coupling portion 6 that elastically couples the base 10 and the oscillator 30 to each other are provided between the base 10 and the oscillator 30.

As illustrated in FIG. 5B, the oscillator 30 includes the oscillating substrate 31 disposed as the first layer, the membrane substrate 32 disposed as the second layer, and the integrated circuit 33 and the die 34 disposed as the third layer.

The oscillator 30 includes a plurality of (for example, four) capacitors including a plurality of (for example, four) membranes 21a to 21d that are deformable in accordance with an ambient pressure difference as sensor electrodes and a plurality of (for example, four) facing electrodes 22a to 22d (22c and 22d are not illustrated) spaced apart from the membranes 21a to 21d, respectively. These capacitors are connected in parallel to each other via internal wiring (not illustrated). Installation of the plurality of capacitors increases the total installation area of the capacitors, thus enabling the improvement of the sensitivity to pressure changes. In addition, the deviations of the capacitor characteristics are averaged because the signals obtained from a plurality of capacitors are averaged, thus enabling a reduction in measurement error.

As illustrated in FIG. 5B, the oscillator 30 includes the integrated circuit 33 that processes the electric signals from the capacitors.

The facing electrodes 22a to 22d of the capacitors are provided directly on the upper surface of the integrated circuit 33. In addition, the electrically insulated spacer portion 32a is provided on the upper surface of the integrated circuit 33 to maintain the gaps of the capacitors. The membrane substrate 32 having conductivity and flexibility is installed on the spacer portion 32a, and the regions not in contact with the spacer portion 32a define and function as the deformable membranes 21a to 21d.

The membrane substrate 32 and the spacer portion 32a include the vias 24, the conductors 25, and the like to connect terminals 23 of the integrated circuit 33, and an electrically insulated layer (not illustrated) is provided between the vias 24 and the membrane substrate 32 and between the conductors 25 and the membrane substrate 32. In addition, the spacers 26 having conductivity are provided on the upper surface of the membrane substrate 32, and the vias 27a to 27d are provided in the oscillating substrate 31. The vias 27a to 27d are electrically connected to the joint portions 11a to 11d, respectively, through a plurality of (for example, four) conductors 28 provided on the upper surface of the oscillating substrate 31. Electricity can be supplied from the mounting substrate of a product to the integrated circuit 33 or the output signal from the integrated circuit 33 can be transmitted to the mounting substrate through the terminals 23, the vias 24, the conductors 25, the spacers 26, the vias 27a to 27d, the conductors 28, and the joint portions 11a to 11d.

In the present preferred embodiment, the membranes 21a to 21d are disposed so as not to overlap the base 10 in plan view (see FIG. 5A) in the direction orthogonal or substantially orthogonal to the membranes 21a to 21d. Accordingly, even when the oscillator 30 vibrates up and down due to an external impact on the sensor body, the membranes 21a to 21d do not collide with the base 10. As a result, deformation, damage, and a change in the characteristics of the membranes due to an external impact can be reduced or prevented.

In addition, the base 10 is disposed outside the oscillator 30 across the isolation groove 5. This can increase the distance to the membranes 21a to 21d from the joint portions 11a to 11d to join to the mounting substrate. For example, when solder balls are used as the joint portions 11a to 11d, the effect of foreign matter due to the infiltration of flux or the like can be reduced.

Preferred Embodiment 6

Figure 6:
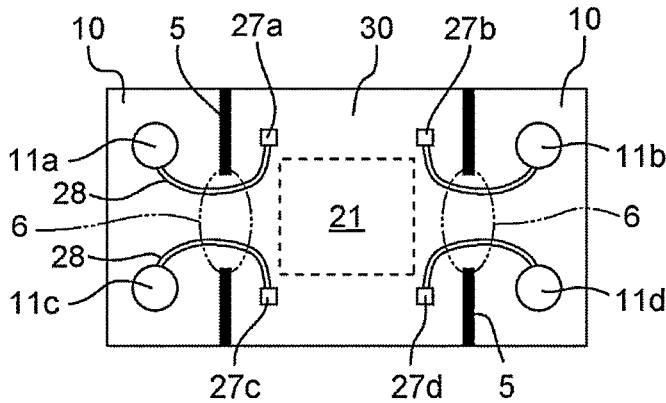
FIG. 6 is a plan view illustrating an example of the structure of a pressure sensor device according to preferred embodiment 6 of the present invention.

FIG. 6 is a plan view illustrating an example of the structure of a pressure sensor device according to preferred embodiment 6 of the present invention. Since the sectional view illustrating the internal structure is the same as or similar to the sectional views described in preferred embodiments 1 to 5, duplicate description is omitted. The basic structure and operation in the present preferred embodiment are the same as or similar to those in preferred embodiment 1 except that bases 10 are disposed separately in two portions on the left and right sides of the oscillator 30.

The pressure sensor device includes the two bases 10 and the oscillator 30 disposed between the two bases 10. The bases 10 include electrically insulated substrates, and the plurality of (for example, four) joint portions 11a to 11d are provided on the substrates.

The oscillator 30 is supported so as to be able to oscillate with respect to the bases 10, and a both-end supported beam structure is provided as an example here. To achieve the oscillation support structure as described above, two pairs of L-shaped isolation grooves 5 that isolate most of the portion between the bases 10 and the oscillator 30 and elastic coupling portions 6 that elastically couple the bases 10 and the oscillator 30 to each other are provided between bases 10 and the oscillator 30.

The oscillator 30 includes a capacitor including the membrane 21 that is deformable in accordance with an ambient pressure difference as a sensor electrode and a facing electrode (not illustrated) spaced apart from the membrane 21.

The oscillator 30 further includes an integrated circuit (not illustrated) that processes the electric signal from the capacitor. The oscillating substrate of the oscillator 30 includes the vias 27a to 27d electrically connected to the integrated circuit. The vias 27a to 27d are electrically connected to the joint portions 11a to 11d, respectively, through a plurality of (for example, four) conductors 28 provided on the upper surface of the oscillating substrate.

In the present preferred embodiment, the membrane 21 is disposed so as not to overlap the bases 10 in plan view (see FIG. 6) in the direction orthogonal or substantially orthogonal to the membrane 21. Accordingly, even when the oscillator 30 vibrates up and down due to an external impact on the sensor body, the membrane 21 does not collide with the base 10. As a result, deformation, damage, and a change in the characteristics of the membrane due to an external impact can be reduced or prevented.

Preferred Embodiment 7

Figure 7:
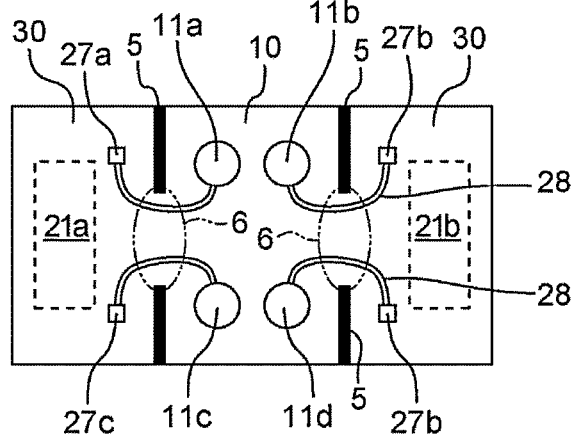
FIG. 7 is a plan view illustrating an example of the structure of a pressure sensor device according to preferred embodiment 7 of the present invention.

FIG. 7 is a plan view illustrating an example of the structure of a pressure sensor device according to preferred embodiment 7 of the present invention. Since the sectional view illustrating the internal structure is the same as or similar to the sectional views described in preferred embodiments 1 to 5, duplicate description is omitted. The basic structure and operation in the present preferred embodiment are the same as or similar to those in preferred embodiment 1 except that oscillators 30 are disposed separately in two portions on the left and right sides of the base 10.

The pressure sensor device includes the base 10 and the oscillators 30 disposed on both left and right sides of the base 10. The base 10 includes an electrically insulated substrate, and a plurality of (for example, four) joint portions 11a to 11d are provided on the substrate.

The oscillators 30 are supported so as to be able to oscillate with respect to the base 10, and a cantilever structure is provided as an example here. To achieve the oscillation support structure as described above, two pairs of L-shaped isolation grooves 5 that isolate most of the portion between the base 10 and the oscillators 30 and elastic coupling portions 6 that elastically couple the base 10 and the oscillators 30 to each other are provided between the base 10 and the oscillators 30.

The oscillator 30 includes capacitors including a plurality of (for example, two) membranes 21a and 21b that are deformable in accordance with an ambient pressure difference as sensor electrodes and a plurality of (for example, two) facing electrodes (not illustrated) spaced apart from the membranes 21a and 21b. These capacitors are connected in parallel to each other via internal wiring (not illustrated).

The oscillators 30 further include integrated circuits (not illustrated) that process the electric signals from the capacitors. The oscillating substrates of the oscillators 30 include the vias 27a to 27d electrically connected to the integrated circuits. The vias 27a to 27d are electrically connected to the joint portions 11a to 11d, respectively, through a plurality of (for example, four) conductors 28 provided on the upper surface of the oscillating substrate.

In the present preferred embodiment, the membranes 21a and 21b are disposed so as not to overlap the base 10 in plan view (see FIG. 7) in the direction orthogonal or substantially orthogonal to the membranes 21a and 21b. Accordingly, even when the oscillators 30 vibrate up and down due to an external impact on the sensor body, the membranes 21a and 21b do not collide with the base 10. As a result, deformation, damage, and a change in the characteristics of the membranes due to an external impact can be reduced or prevented.

Preferred Embodiment 8

Figure 8:
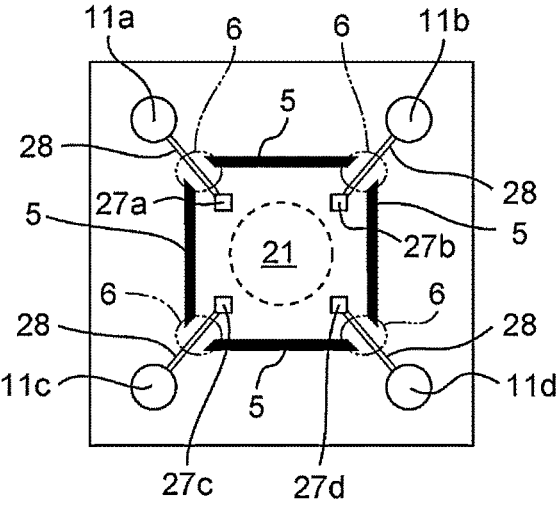
FIG. 8 is a plan view illustrating an example of the structure of a pressure sensor device according to preferred embodiment 8 of the present invention.

FIG. 8 is a plan view illustrating an example of the structure of a pressure sensor device according to preferred embodiment 8 of the present invention. Since the sectional view illustrating the internal structure is the same as or similar to the sectional views described in preferred embodiments 1 to 5, duplicate description is omitted. The basic structure and operation in the present preferred embodiment are the same as or similar to those in preferred embodiment 1 except that the base 10 is disposed inside the oscillator 30.

The pressure sensor device includes the base 10 and the oscillator 30 disposed inside the base 10. The base 10 includes an electrically insulated substrate, and the plurality of (for example, four) joint portions 11a to 11d are provided on the substrate.

The oscillator 30 is supported so as to be able to oscillate with respect to the base 10, and a four-corner support structure is provided as an example here. To achieve the oscillation support structure as described above, four linear isolation grooves 5 that isolate most of the portion between the base 10 and the oscillator 30 and an elastic coupling portion 6 that elastically couples the base 10 and the oscillator 30 to each other are provided between the base 10 and the oscillator 30.

The oscillator 30 includes a capacitor including the membrane 21 that is deformable in accordance with an ambient pressure difference as a sensor electrode and a facing electrode (not illustrated) spaced apart from the membrane 21.

The oscillator 30 further includes an integrated circuit (not illustrated) that processes the electric signal from the capacitor. The oscillating substrate of the oscillator 30 includes the vias 27a to 27d electrically connected to the integrated circuit. The vias 27a to 27d are electrically connected to the joint portions 11a to 11d, respectively, through a plurality of (for example, four) conductors 28 provided on the upper surface of the oscillating substrate.

In the present preferred embodiment, the membrane 21 is disposed so as not to overlap the base 10 in plan view (see FIG. 8) in the direction orthogonal or substantially orthogonal to the membrane 21. Accordingly, even when the oscillator 30 vibrates up and down due to an external impact on the sensor body, the membrane 21 does not collide with the base 10. As a result, deformation, damage, and a change in the characteristics of the membrane due to an external impact can be reduced or prevented.

Preferred Embodiment 9

Figure 9:
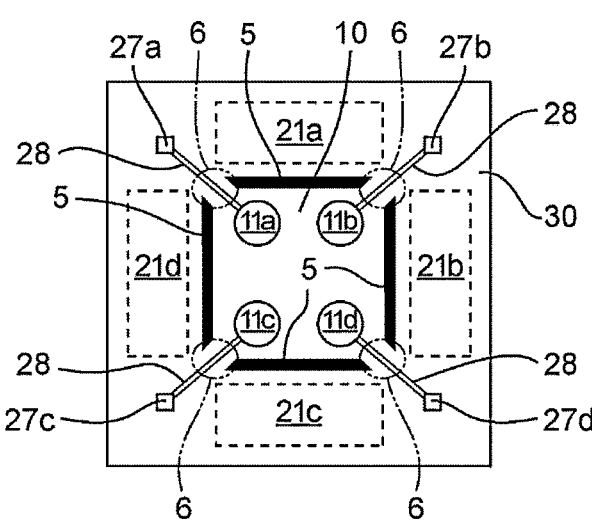
FIG. 9 is a plan view illustrating an example of the structure of a pressure sensor device according to preferred embodiment 9 of the present invention.

FIG. 9 is a plan view illustrating an example of the structure of a pressure sensor device according to preferred embodiment 9 of the present invention. Since the sectional view illustrating the internal structure is the same as or similar to the sectional views described in preferred embodiments 1 to 5, duplicate description is omitted. The basic structure and operation in the present preferred embodiment are the same as or similar to those in preferred embodiment 1 except that the oscillator 30 is disposed on the upper, lower, left, and right sides of the base 10.

The pressure sensor device includes the base 10 and the oscillator 30 disposed outside the base 10. The base 10 includes an electrically insulated substrate, and the plurality of (for example, four) joint portions 11a to 11d are provided on the substrate.

The oscillator 30 is supported so as to be able to oscillate with respect to the base 10, and a four-corner support structure is provided as an example here. To achieve the oscillation support structure as described above, four linear isolation grooves 5 that isolate most of the portion between the base 10 and the oscillator 30 and an elastic coupling portion 6 that elastically couples the base 10 and the oscillator 30 to each other are provided between the base 10 and the oscillator 30.

The oscillator 30 includes capacitors including a plurality of (for example, four) membranes 21a and 21d that are deformable in accordance with an ambient pressure difference as sensor electrodes and facing electrodes (not illustrated) spaced apart from the membranes 21a and 21d. These capacitors are connected in parallel to each other via internal wiring (not illustrated).

The oscillator 30 further includes an integrated circuit (not illustrated) that processes the electric signals from the capacitors. The oscillating substrate of the oscillator 30 includes the vias 27a to 27d electrically connected to the integrated circuit. The vias 27a to 27d are electrically connected to the joint portions 11a to 11d, respectively, through a plurality of (for example, four) conductors 28 provided on the upper surface of the oscillating substrate.

In the present preferred embodiment, the membranes 21a to 21d are disposed so as not to overlap the base 10 in plan view (see FIG. 9) in the direction orthogonal or substantially orthogonal to the membranes 21a to 21d. Accordingly, even when the oscillator 30 vibrates up and down due to an external impact on the sensor body, the membranes 21 do not collide with the base 10. As a result, deformation, damage, and a change in the characteristics of the membranes due to an external impact can be reduced or prevented.

The present invention is not limited to the preferred embodiments described above and can be implemented in various other ways. For example, the pressure applied to the membrane 21 is calculated in accordance with the electrostatic capacitance between the membrane 21 and the fixed electrode in the preferred embodiments described above, but the present invention is not limited to this example. For example, the membrane 21 may include a circuit including a plurality of piezoresistive elements and the pressure applied to the membrane 21 may be calculated in accordance with the electric signal output depending on the deflective deformation of the membrane 21.

The present invention has been sufficiently described with reference to the preferred embodiments and the accompanying drawings, but various variations and modifications are apparent to those skilled in the art. It should be understood that such variations and modifications are included in the present invention unless the variations and the modifications depart from the scope of the present invention defined in the appended claims.

Preferred embodiments of the present invention are industrially very useful because each is able to reduce or prevent deformation, damage, and a change in the characteristics of the membrane due to an external impact.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A pressure sensor device comprising:
a base including a joint portion to mount the base; and
an oscillator to oscillate with respect to the base; wherein
the oscillator includes a membrane that is deformable in accordance with an ambient pressure difference as a sensor electrode; and
the membrane does not overlap the base in a plan view in a direction orthogonal or substantially orthogonal to the membrane.

2. The pressure sensor device according to claim 1, wherein an isolation groove that isolates the base and the oscillator from each other and an elastic coupling portion that elastically couples the base and the oscillator to each other are provided between the base and the oscillator.

3. The pressure sensor device according to claim 2, wherein the isolation groove is C-shaped.

4. The pressure sensor device according to claim 1, wherein the base is located outside the oscillator.

5. The pressure sensor device according to claim 1, wherein the oscillator is located outside the base.

6. The pressure sensor device according to claim 1, wherein the oscillator includes a first layer located on a same plane as the base, a second layer fixed to the first layer with a gap therebetween, the second layer including the membrane, and a third layer facing the second layer.

7. The pressure sensor device according to claim 1, wherein the oscillator includes a plurality of membranes connected in parallel to each other, the membrane being one of the plurality of membranes.

8. The pressure sensor device according to claim 1, wherein the oscillator includes an integrated circuit to process an electric signal generated by deformation of the membrane.

9. The pressure sensor device according to claim 8, wherein the oscillator includes a plurality of via terminals through which electricity is supplied to the integrated circuit and the signal output from the integrated circuit is transmitted;

the base includes a same number of joint portions as the via terminals, the joint portion being one of the joint portions; and the via terminals and the joint portions are electrically connected to each other by a plurality of conductors.

10. The pressure sensor device according to claim 8, wherein the oscillator includes a die on which the integrated circuit is mounted.

11. The pressure sensor device according to claim 1, wherein the oscillator includes a capacitor including a facing electrode spaced apart from the membrane to detect a change in an electrostatic capacitance of the capacitor.

12. The pressure sensor device according to claim 11, wherein the oscillator includes a first layer located on a same plane as the base, a second layer fixed to the first layer with a gap therebetween, the second layer including the membrane, and a third layer facing the second layer; and the facing electrode is provided on the third layer.

13. The pressure sensor device according to claim 1, wherein the base includes a plurality of the joint portions.

14. The pressure sensor device according to claim 1, wherein the joint portion is defined by a solder ball.

15. The pressure sensor device according to claim 1, wherein the oscillator is adjacent to the base.

16. The pressure sensor device according to claim 1, further comprising:

a second base; wherein the oscillator is located between the base and the second base.

17. The pressure sensor device according to claim 16, wherein the base and the second base are at two locations along a diagonal of the oscillator.

18. The pressure sensor device according to claim 16, wherein the base and the second base are respectively located on left and right sides of the oscillator.

* * * * *